United States Patent
Katou et al.

[11] Patent Number: 6,051,794
[45] Date of Patent: Apr. 18, 2000

[54] WATERPROOFING MEMBER FOR WIRE HARNESS CONNECTING PORTION

[75] Inventors: Manabu Katou, Hamamatsu, Japan; Tatsuya Suzuki, West Bloomfield, Mich.

[73] Assignee: Asmo Co., Ltd., Japan

[21] Appl. No.: 08/948,394

[22] Filed: Oct. 10, 1997

[30] Foreign Application Priority Data

Oct. 17, 1996 [JP] Japan ................................ 8-275070

[51] Int. Cl.⁷ .......................... H01B 17/26; H01B 17/30; H01B 17/00
[52] U.S. Cl. ............. 174/152 G; 174/151; 174/152 R; 174/153 R; 174/153 G
[58] Field of Search ..................... 174/152 G, 151, 174/152 R, 153 R, 153 G, 65 R, 65 RG, 65 SS

[56] References Cited

U.S. PATENT DOCUMENTS

| | | | |
|---|---|---|---|
| 3,151,905 | 10/1964 | Reuther et al. | 49/167 |
| 3,166,333 | 1/1965 | Henley | 277/635 |
| 3,704,894 | 12/1972 | Didszuhn | 277/636 |
| 4,961,480 | 10/1990 | Weiler et al. | 188/73.44 |
| 5,092,647 | 3/1992 | Ueda et al. | 296/146 |
| 5,419,217 | 5/1995 | Umezawa et al. | 74/567 |
| 5,487,680 | 1/1996 | Yamanashi | 439/552 |
| 5,540,450 | 7/1996 | Hayashi et al. | 277/607 |
| 5,588,260 | 12/1996 | Suzuki et al. | 49/502 |

FOREIGN PATENT DOCUMENTS

| | | |
|---|---|---|
| 1-86185 | 6/1989 | Japan . |
| 6-144130 | 5/1994 | Japan . |

*Primary Examiner*—Kristine Kincaid
*Assistant Examiner*—Mark Olds
*Attorney, Agent, or Firm*—Parkhurst & Wendel, LLP

[57] ABSTRACT

A waterproofing member for a wire harness connecting portion of a motor for driving a window regulator of a vehicle is constructed such that it includes an opening being provided at each axial direction end portion of the waterproofing member, a mounting portion provided at one of the axial direction end portions of the waterproofing member, and fixed to the wire harness connecting portion so as to seal the wire harness connecting portion; a press-fit portion provided at the other of the axial direction end portions of the waterproofing member, and press-fit against a peripheral wall of the through-hole of the door panel so as to seal the through-hole; and further includes an elastic portion which is formed at an axial direction intermediate portion between the mounting portion and the press-fit portion and is formed so as to be elastically deformable along an axial direction of the waterproofing member, which elastic portion being able to change relative positions of the mounting portion and the press-fit portion by deforming elastically.

14 Claims, 9 Drawing Sheets

WATERPROOFING MEMBER FOR WIRE HARNESS CONNECTING PORTION

BACKGROUND OF THE INVENTION

1. Field of the Invention

The present invention relates to a waterproofing member for a wire harness connecting portion which is applied to a motor which drives a power window device of a vehicle or the like.

2. Description of the Related Art

A motor is used as a drive source in, for example, a power window device which raises and lowers a window glass of a vehicle so as to close and open the window glass, and in a sunroof device which opens and closes a sunroof, or the like.

Here, in the power window device, for example, a motor for driving a window regulator is disposed so as to oppose a door inner panel. A wire harness for electrical connection of the motor is inserted through a through-hole (service hole) formed in the door inner panel, and thereafter, reaches the outer side of the door inner panel and is connected to a power source or a control device.

Such a motor and vehicle door must be waterproof. Therefore, conventionally, at the wire harness connecting portion of the motor, the wire harness connecting portion is subjected to a waterproofing processing such as hot melting or the like, and a waterproof connector equipped with an O-ring is used, so as to ensure the waterproofness of the structure. Further, at the aforementioned through-hole (service hole) of the door inner panel, by fixing a grommet for waterproofing to the periphery of the wire harness and fitting the grommet into the through-hole of the door inner panel, entry of water into the interior of the vehicle is prevented.

However, such conventional waterproofing countermeasures have a drawback in that the work involved in fitting the grommet for waterproofing, through which the wire harness is inserted and to which the wire harness is fixed, into the through-hole of the door inner panel is complex, and installability is therefore poor. Moreover, because the grommet for waterproofing is positioned midway along the wire harness, the length of the wire harness and the position of the grommet must be made different, whereby a different wire harness or the like must be used as an individual peculiar member to be set for each motor or for each type of vehicle to which the structure is applied. Namely, there is a drawback in that the same types of parts cannot be used commonly for various applications, i.e., standardization of parts cannot be achieved.

In such conventional waterproofing countermeasures, the waterproofing of the motor itself and the waterproofing of the through-hole of the door inner panel are handled independently of one another. Therefore, there are many places for which waterproofing measures are needed, which is a great factor in raising costs and deteriorating assembly workability.

SUMMARY OF THE INVENTION

In view of the aforementioned, an object of the present invention is to provide a waterproofing member for a wire harness connecting portion in which waterproofing of the wire harness connecting portion of a motor for driving a window regulator and waterproofing of a through-hole in a door inner panel can be effected simultaneously, costs can be decreased, assembly workability can be improved, and the range of application can be enlarged.

The waterproofing member for a wire harness connecting portion of claim 1 of the present invention is to make waterproof a wire harness connecting portion for electrical connection of a motor for driving a window regulator of a vehicle, which wire harness connecting portion being disposed so as to oppose a through-hole formed in a door panel of the vehicle, and also to make waterproof a wire harness connected to the wire harness connecting portion being inserted through the through-hole to an exterior portion of the door panel, and for this purpose it comprises an opening provided at each axial direction end portion of the waterproofing member, a mounting portion provided at one of the axial direction end portions of said waterproofing member, and fixed to the wire harness connecting portion so as to seal the wire harness connecting portion; a press-fit portion provided at the other of the axial direction end portions of the waterproofing member, and press-fit against a peripheral wall of the through-hole of the door panel so as to seal the through-hole; and an elastic portion which is formed at an axial direction intermediate portion between the mounting portion and the press-fit portion and is formed so as to be elastically deformable along an axial direction, which elastic portion being able to change relative positions of the mounting portion and the press-fit portion by deforming elastically.

In the waterproofing member for a wire harness connecting portion of claim 1, the mounting portion is fixed to the wire harness connecting portion of the motor and seals this portion so that entry of water into the motor is prevented. In this state, the wire harness connecting portion of the motor is disposed so as to oppose the through-hole of the door panel of the vehicle. In this state, the press-fit portion of the waterproofing member is press-fit against the peripheral wall of the through-hole of the door panel and seals this portion so that entry of water into the vehicle compartment is prevented. Namely, waterproofing of the wire harness connecting portion of the motor and waterproofing of the through-hole of the door inner panel can be effected simultaneously by a single waterproofing member. Accordingly, only a minimum number of places need be subjected to waterproofing treatment, which results in a reduction in cost and an improvement in assembly workability.

In this case, after the mounting portion of the waterproofing member is fixed to and made integral with the wire harness connecting portion of the motor in advance, assembly is completed merely by the press-fit portion of the waterproofing member being press-fit against the peripheral wall of the through-hole of the door panel. There is no need, as there is in the conventional art, for an operation to fit a grommet for waterproofing into the through-hole of the door inner panel, and for this reason as well, the assembly workability greatly improves.

In the state in which the waterproofing member is disposed between the motor or the wire harness connecting portion and the door panel, the relative positions of the mounting portion (i.e., the wire harness connecting portion of the motor) and the press-fit portion (i.e., the through-hole of the door inner panel) can be changed by elastic deformation of the elastic portion. Accordingly, even if the waterproofing member were to be applied to vehicle doors having different dimensions between the wire harness connecting portion of the motor and the through-hole of the door inner panel, or even in a case in which there was a slight error in the mounting dimension of the motor or the like, the difference in these dimensions would be absorbed by the elastic deformation of the elastic portion. As a result, there is no need, as there is in the conventional art, to change the length of the wire harness or the position of the grommet and to use a different wire harness or the like for each motor or each vehicle to which the waterproofing member is to be applied. The same types of parts can be used commonly for various applications, i.e., standardization of parts can be achieved.

In this way, in the waterproofing member for a wire harness connecting portion of claim 1, waterproofing of the wire harness connecting portion of the motor and waterproofing of the through-hole of the door inner panel can be carried out simultaneously. The cost can be reduced, assembly workability can be improved, and the range of application can be enlarged.

In the waterproofing member for a wire harness connecting portion of claim 2, in the waterproofing member for a wire harness connecting portion of claim 1, the mounting portion has a first fit-in portion which is formed along the axial direction and is fit into a groove formed at the wire harness connecting portion of the motor, and a first flange portion which is formed along a direction orthogonal to the axial direction and is press-fit against a sealing seat surface formed at the wire harness connecting portion of the motor.

In the waterproofing member for a wire harness connecting portion of claim 2, the first fit-in portion is fit into the groove formed in the wire harness connecting portion of the motor. The first flange portion is press-fit against the seal seating surface formed at the wire harness connecting portion, so as to seal this portion. Entry of water into the motor is prevented, and the waterproofness is ensured.

Accordingly, the wire harness connecting portion of the motor can reliably be made waterproof regardless of the form of the wire harness connecting portion of the motor (e.g., regardless of whether a so-called director connector in which the connector for electrical connection is directly connected is used, or a so-called lead wire type in which a lead wire for electrical connection is directly connected is used, or the like).

Further, in the state in which the waterproofing member is installed (i.e., the state in which the first fit-in portion is fit into the groove and the first flange portion is press-fit against the sealing seat surface), the first fit-in portion which is fit in the groove acts as a stopper for preventing the position of the waterproofing member from shifting. Therefore, after the waterproofing member is mounted to the motor, the mounting position thereof does not shift, so that the waterproofness is further ensured.

In the waterproofing member for a wire harness connecting portion of claim 3, in the waterproofing member for a wire harness connecting portion of claim 1, the press-fit portion has a second fit-in portion which is formed along the axial direction and is fit into the through-hole of the door panel, and a second flange portion which is formed along a direction orthogonal to the axial direction and is press-fit against the peripheral wall of the through-hole of the door panel.

In the waterproofing member for a wire harness connecting portion of claim 3, the second fit-in portion is fit into the through-hole of the door panel, and the second flange portion is press-fit against the peripheral wall of the through-hole of the door panel, such that this portion is sealed. Entry of water into the vehicle compartment is prevented, and the waterproofness is ensured. In this way, assembly is completed merely by fitting the second fit-in portion into the through-hole and press-fitting the second flange portion against the peripheral wall of the through-hole. Assembly workability is thereby greatly improved.

Further, in the state in which the waterproofing member is installed (i.e., the state in which the second fit-in portion is fit into the through-hole and the second flange portion is press-fit against the peripheral wall of the through-hole), the second fit-in portion which is fit in the through-hole functions as a stopper for preventing shifting of the position of the waterproofing member. As a result, after the waterproofing member is mounted, the mounted position thereof does not shift, so that the waterproofness is even more ensured.

In the waterproofing member for a wire harness connecting portion of a claim 13, in the waterproofing member for a wire harness connecting portion of claim 2, the press-fit portion is formed continuously with said elastic portion and such that a diameter of said press-fit portion gradually increases.

In the waterproofing member for a wire harness connecting portion of claim 13, the press-fit portion is press-fit against the peripheral wall of the through-hole of the door panel so as to seal this portion. Entry of water into the vehicle compartment is prevented, and waterproofness is ensured. In this way, assembly is completed merely by press-fitting the press-fit portion against the peripheral wall of the through-hole, and the assembly workability is greatly improved.

Further, the press-fit portion is formed so as to be continuous with the elastic portion and such that the diameter thereof gradually increases, i.e., is formed in a so-called suction cup shape. Therefore, not only can waterproofness be ensured, but also, the configuration of the press-fit portion is such that the waterproofing member can be manufactured easily and is therefore inexpensive.

DESCRIPTION OF THE PREFERRED EMBODIMENTS

Figure 6:
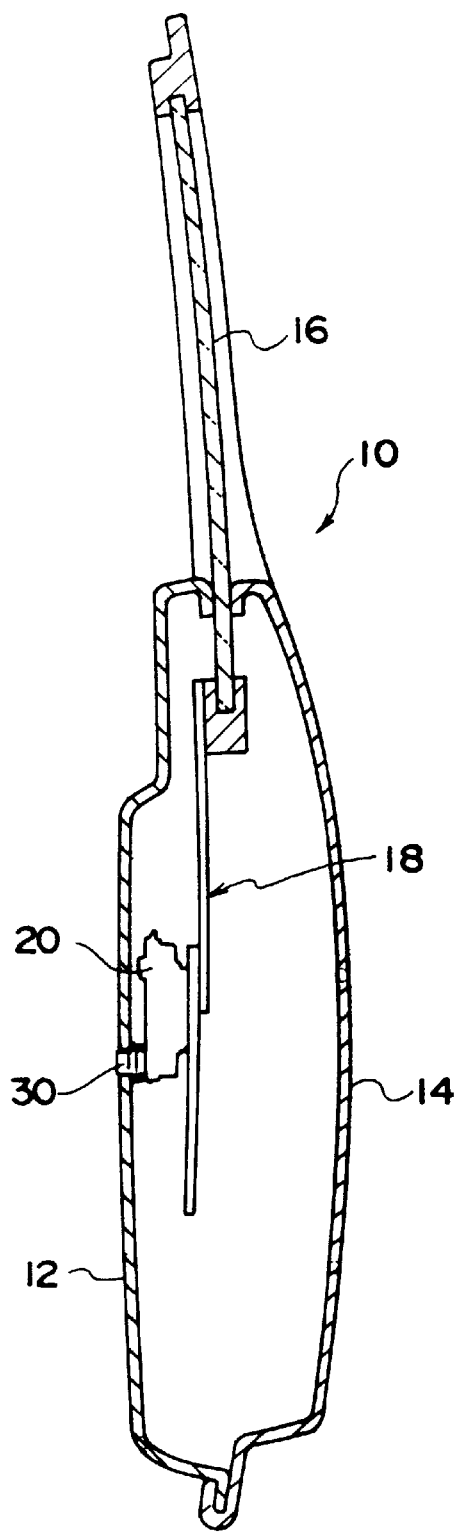
FIG. 6 is a cross-sectional view illustrating the overall structure of a vehicle door to which the waterproofing member relating to the first embodiment of the present invention is applied.

The overall structure of a vehicle door 10, to which a waterproofing member 30 relating to a first embodiment of the present invention is applied, is illustrated in cross-section in FIG. 6.

The vehicle door 10 is formed from a door inner panel 12 and a door outer panel 14, and includes a power window device or window regulator 18 for raising and lowering a window glass 16. A motor 20 is disposed at the driving portion of the window regulator 18. The window glass 16 can be raised and lowered due to operation of the motor 20. The waterproofing member 30 is mounted to the motor 20.

Figure 3:
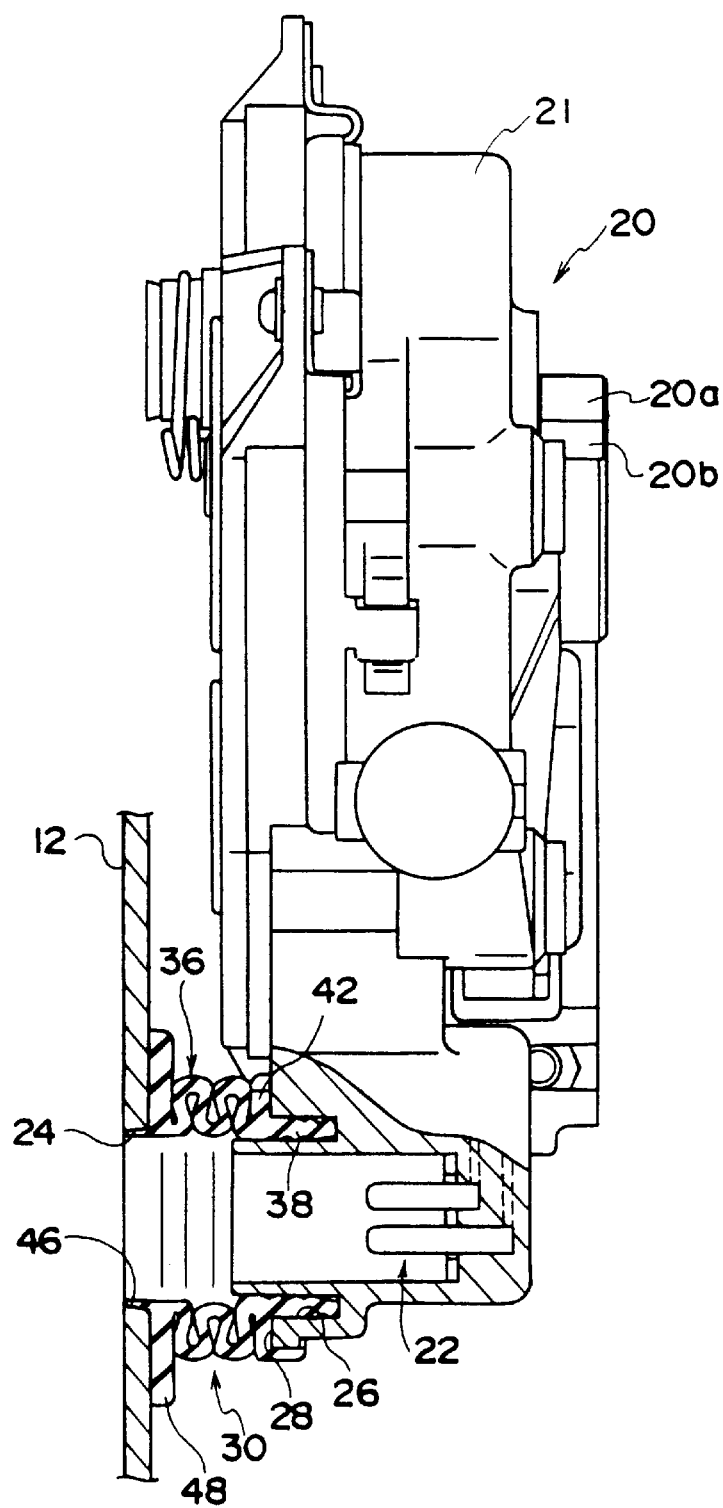
FIG. 3 is a partially broken side view of the waterproofing member relating to the first embodiment of the present invention and a motor to which the waterproofing member is applied.
Figure 4:
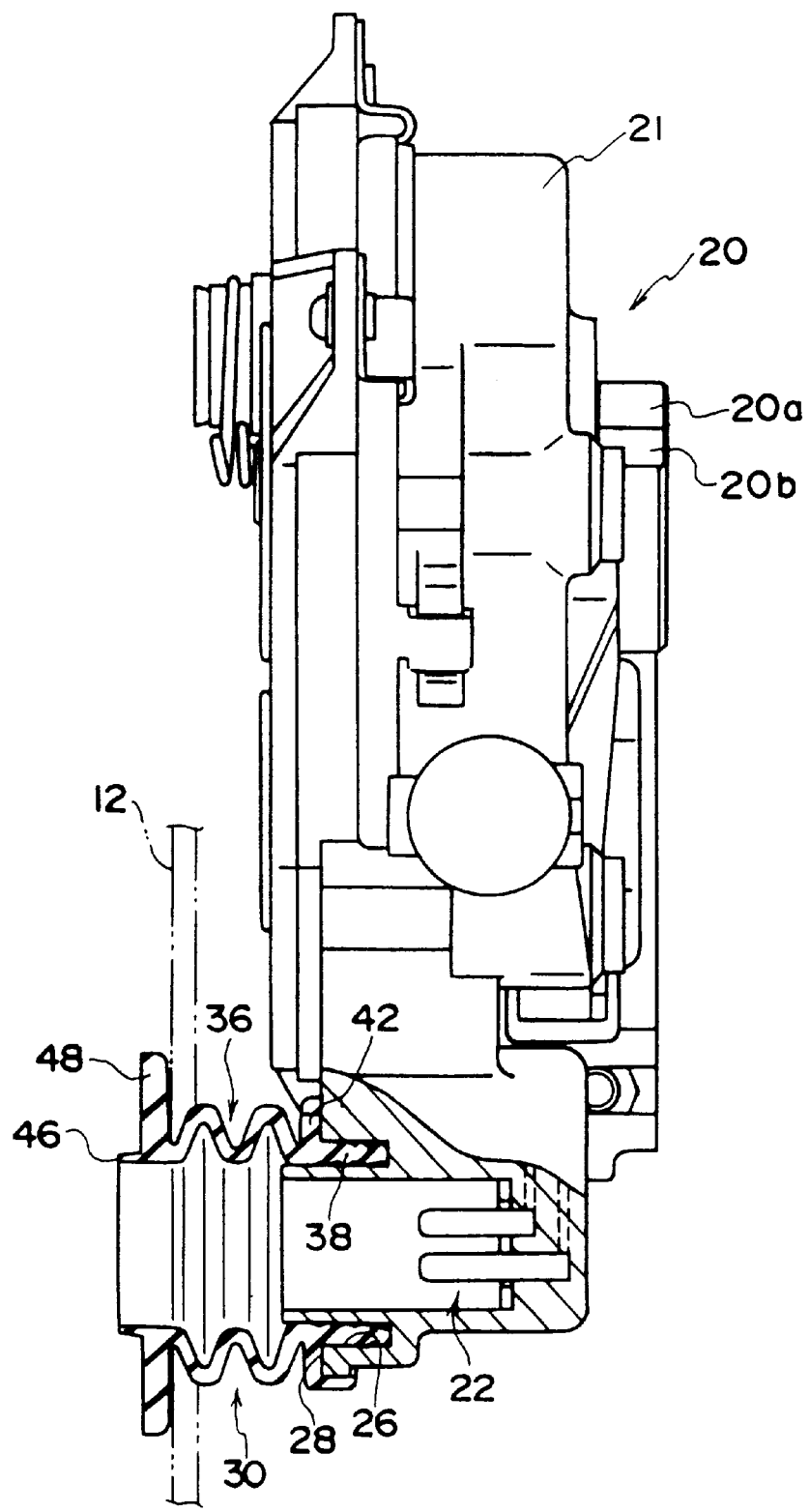
FIG. 4 is a partially broken side view corresponding to FIG. 3 and illustrating the waterproofing member relating to the first embodiment of the present invention and the motor to which the waterproofing member is applied, wherein the waterproofing member is in its natural state.
Figure 5:
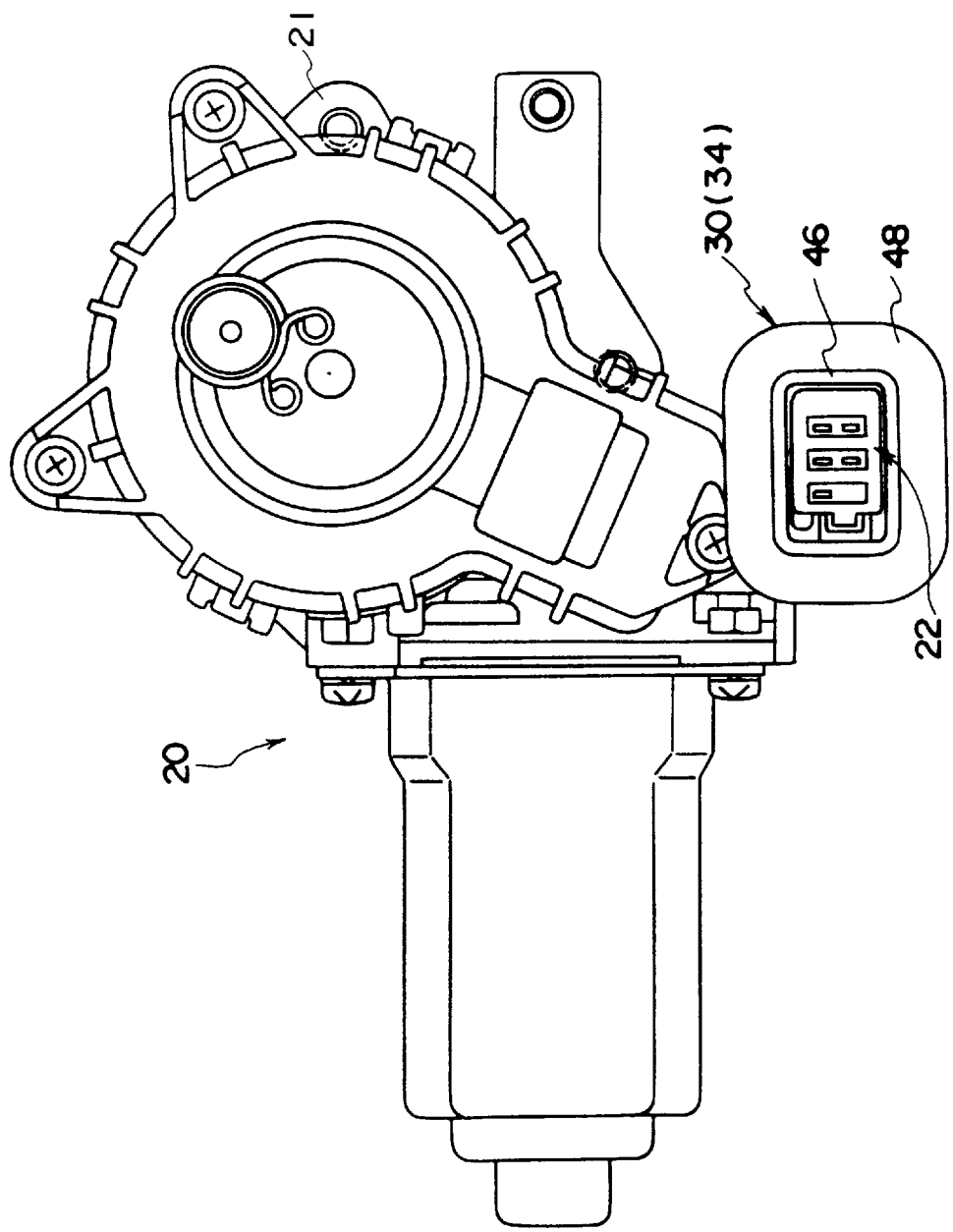
FIG. 5 is a front view of the waterproofing member relating to the first embodiment of the present invention and the motor to which the waterproofing member is applied.

FIGS. 3 and 4 are side views of the waterproofing member 30 and the motor 20 accommodated in a housing 21, to which motor 20 the waterproofing member 30 is applied. FIG. 5 is a front view of the waterproofing member 30 and the motor 20.

The motor 20 includes a wire harness connecting portion 22 for electrical connection, at the side of the housing 21 opposite the side at which an output gear 20a for driving the window regulator is disposed. The wire harness connecting portion 22 is disposed so as to oppose a through-hole 24 formed in the door inner panel 12. A wire harness connector (not shown) for electrical connection is connected to the wire harness connecting portion 22. The wire harness (not illustrated) is inserted through the through-hole 24, and reaches the outer portion or the vehicle compartment inner side of the door inner panel 12. A groove 26 and a sealing seat surface 28 are formed at the wire harness connecting portion 22, and the waterproofing member 30 is mounted to the wire harness connecting portion 22.

The height, in the motor output shaft axial direction, of the wire harness connecting portion 22 is smaller than the height of a housing 21. The wire harness connecting portion 22 is disposed parallel to the output shaft 20b of the motor 20.

Figure 1:
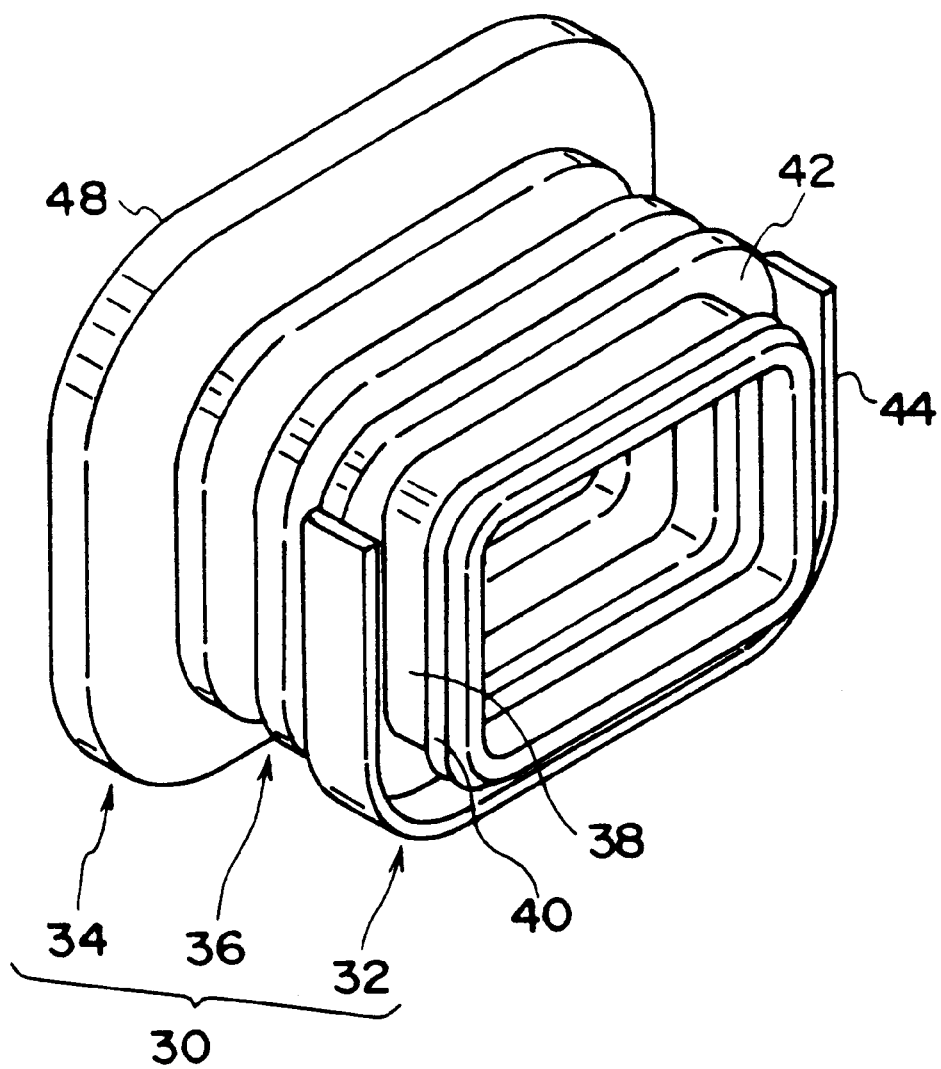
FIG. 1 is a perspective view, as seen from the front, of a waterproofing member relating to a first embodiment of the present invention.
Figure 2:
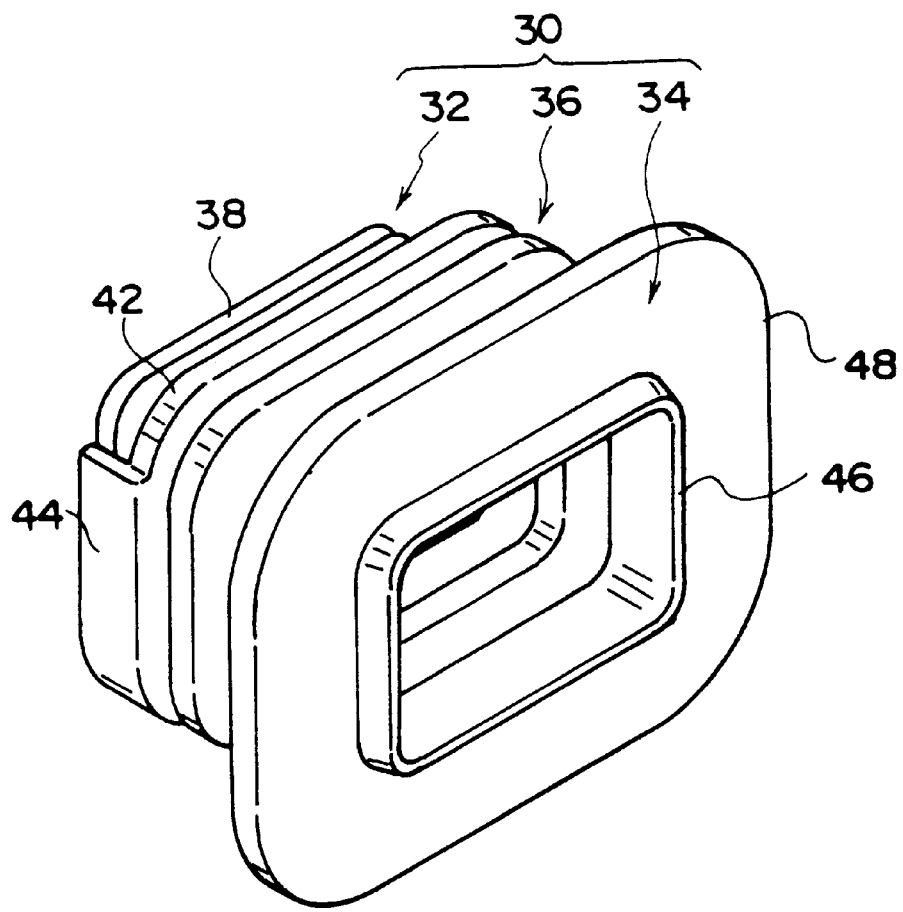
FIG. 2 is a perspective view, as seen from the rear, of the waterproofing member relating to the first embodiment of the present invention.

FIGS. 1 and 2 are perspective views of the waterproofing member 30.

The waterproofing member 30 is formed on the whole as a substantial tube whose both axial direction end portions are open, and is formed by a mounting portion 32, a press-fit portion 34, and an elastic portion 36.

The mounting portion 32 is provided at one axial direction end portion of the waterproofing member 30. A first fit-in portion 38 is formed at the mounting portion 32 along the axial direction thereof. The first fit-in portion 38 is fit into the groove 26 formed in the wire harness connecting portion 22 of the motor 20. Convex-and-concave portions 40 are formed at the periphery of the first fit-in portion 38. The convex-and-concave portions 40 press-contact the inner peripheral wall of the groove 26. In this way, the first fit-in portion 38 is reliably fit into the groove 26 and cannot be pulled out therefrom. A first flange portion 42 is formed at the mounting portion 32 along a direction orthogonal to the axis of the waterproofing member 30, and is press-fit against the seal seating surface 28 formed at the wire harness connecting portion 22 of the motor 20. Further, a cover portion 44 extends out in an orthogonal direction from the peripheral edge of the first flange portion 42. In a state in which the mounting portion 32 is fixed to the wire harness connecting portion 22, the cover portion 44 covers the peripheral edge portion of the wire harness connecting portion 22, so that the fixability and the sealability are ensured even more. The cover portion 44 is formed only at three sides of the peripheral edge of the first flange portion 42 (i.e., the cover portion 44 is not formed at the upper side of the first flange portion 42). The cover portion 44 is set in accordance with the configuration of the wire harness connecting portion 22 so as to not interfere needlessly.

Due to the mounting portion 32 structured as described above, the waterproofing member 30 or the mounting portion 32 is fixed to the wire harness connecting portion 22 of the motor 20, and this portion comprising the wire harness, the connector, and the like positioned at the inner side is sealed so as to prevent water from entering into the interior of the motor 20 so as to ensure waterproofness.

The press-fit portion 34 is provided at the other axial direction end portion of the waterproofing member 30. A second fit-in portion 46 is formed at the press-fit portion 34 along the axial direction of 30. The second fit-in portion 46 is fit into the through-hole 24 formed in the door inner panel 12. A second flange portion 48 is formed at the press-fit portion 34 along a direction orthogonal to the axial direction. The second flange portion 48 is press-fit against the peripheral wall of the through-hole 24 formed in the door inner panel 12. In this way, the waterproofing member 30 and the press-fit portion 34 is press-fit against the peripheral wall of the through-hole 24 of the door inner panel 12, and this portion is sealed. Entry of water into the vehicle compartment is prevented, and the waterproofness can be ensured.

The elastic portion 36 is provided at the axial direction intermediate portion between the mounting portion 32 and the press-fit portion 34. The elastic portion 36 is formed in a bellows shape, in which convex and concave portions are continuous along the axial direction, and is capable of elastic deformation (extension and contraction). The relative positions of the mounting portion 32 and the press-fit portion 34 can be changed by the elastic deformation of the elastic portion 36. In this way, in a state in which the waterproofing member 30 is disposed between the motor 20 or the wire harness connecting portion 22 and the door inner panel 12 (the through-hole 24), due to elastic deformation of the elastic portion 36, the relative positions of the mounting portion 32 (i.e., the wire harness connecting portion 22 of the motor 20) and the press-fit portion 34 or i.e., of the door inner panel 12 can be automatically absorbed.

Next, operation of the first embodiment will be described.

At the waterproofing member 30 structured as described above, as illustrated in FIGS. 3 and 4, the first fit-in portion 38 of the mounting portion 32 is fit into the groove 26 formed in the wire harness connecting portion 22 of the motor 20, and the first flange portion 42 is press-fit against the sealing seat surface 28 formed at the wire harness connecting portion 22. This portion is thereby sealed, such that entry of water into the motor is prevented, and waterproofness is ensured. In this state, the wire harness connecting portion 22 of the motor is disposed so as to oppose the through-hole 24 of the door inner panel 12. With the motor 20 and the waterproofing member 30 disposed in this state, as illustrated in FIG. 3, the second fit-in portion 46 of the press-fit portion 34 is fit in the through-hole 24 of the door inner panel 12, and the second flange portion 48 is press-fit against the peripheral wall of the through-hole 24 of the door inner panel 12. This portion is thereby sealed, such that entry of water into the vehicle compartment is prevented, and waterproofness is ensured.

In this way, waterproofing of the wire harness connecting portion 22 of the motor 20 and waterproofing of the through-hole 24 of the door inner panel 12 can be carried out simultaneously by the single waterproofing member 30. Accordingly, only a minimum number of places need be subjected to waterproofing treatment, which results in a reduction in cost and an improvement in assembly workability.

Further, in this case, after the mounting portion 32 of the waterproofing member 30 is, in advance, fixed to and made integral with the wire harness connecting portion 22 of the motor 20 (the state illustrated in FIG. 4), assembly is completed by merely fitting the press-fit portion 34 or the second fit-in portion 46 of the waterproofing member 30 into the through-hole 24 of the door inner panel 12, and press-fitting the second flange portion 48 against the peripheral wall of the through-hole 24. There is no need for an operation of fitting a grommet for waterproofing into the through-hole 24 of the door inner panel 12 as there is in the prior art. Therefore, in this way as well, assembly workability can be greatly improved.

Further, in the state in which the waterproofing member 30 is mounted to the motor 20 (i.e., the state in which the first fit-in portion 38 is fit in the groove 26 and the first flange portion 42 is press-fit against the sealing seat surface 28), the first fit-in portion 38 which is fit in the groove 26 serves as a stopper for preventing the shifting of the position of the waterproofing member 30. As a result, after the waterproofing member 30 has been mounted to the motor 20, the mounted position of the waterproofing member 30 does not shift, and the waterproofness is further ensured. Similarly, in the state in which the waterproofing member 30 is press-fit against the through-hole 24 of the door inner panel 12 (i.e., in the state in which the second fit-in portion 46 is fit into the through-hole 24 and the second flange portion 48 is press-fit against the peripheral wall of the through-hole 24), the second fit-in portion 46 which is fit in the through-hole 24 serves as a stopper for preventing shifting of the position of the waterproofing member 30. Therefore, after the waterproofing member 30 has been mounted, the mounted position thereof does not shift, and the waterproofness is also ensured.

In the state in which the waterproofing member 30 is disposed between the motor 20 or the wire harness connecting portion 22 and the door inner panel 12 (the through-hole 24) (i.e., in the state illustrated in FIG. 3), the relative positions of the mounting portion 32 (i.e., the wire harness connecting portion 22 of the motor 20) and the press-fit portion 34 (i.e., the through-hole 24 of the door inner panel 12) can be changed due to elastic deformation of the elastic portion 36. Accordingly, even if the waterproofing member 30 were to be applied to vehicle doors respectively having different dimensions between the wire harness connecting portion 22 of the motor 20 and the through-hole 24 of the door inner panel 12, or even if there was a slight error or the like in the mounting dimension of the motor 20, the difference in these dimensions would be absorbed by the elastic deformation of the elastic portion 36. As a result, there is no need, as there is in the conventional art, to change the length of the wire harness or the position of the grommet and to use a different wire harness or the like for each motor 20 or each vehicle to which the waterproofing member 30 is to be applied. The same types of parts can be used commonly for various applications, i.e., standardization of parts can be achieved.

In this way, with the waterproofing member 30 relating to the first embodiment, waterproofing of the wire harness connecting portion 22 of the motor 20 and waterproofing of the through-hole 24 of the door inner panel 12 can be carried out simultaneously. Costs can be reduced, assembly workability can be improved, and the range of application can be enlarged.

Figure 7:
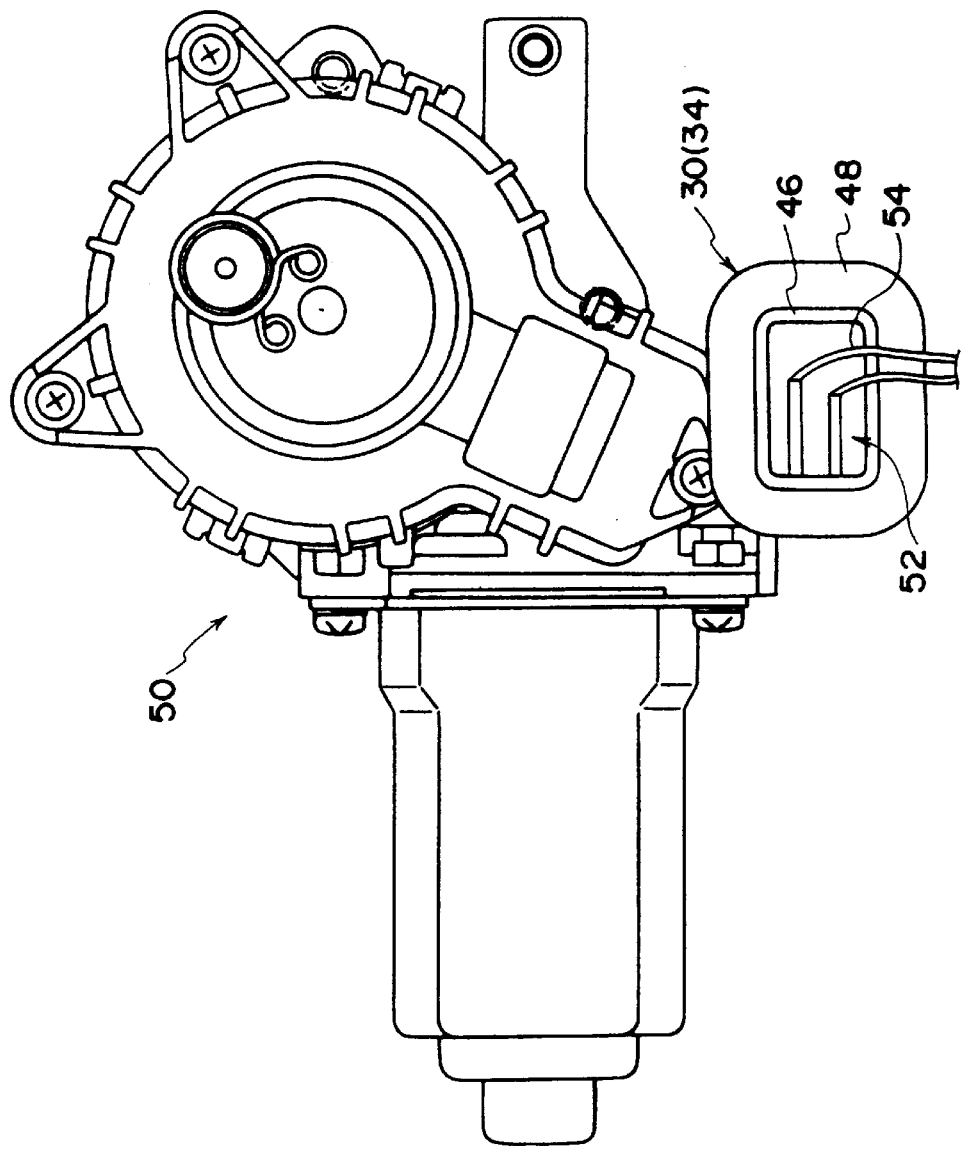
FIG. 7 is a front view of a motor and illustrates another example of application of the waterproofing member relating to the first embodiment of the present invention.

In the above-described first embodiment, a so-called director connector, in which the wire harness for electrical connection and the connector are directly connected, is used at the wire harness connecting portion 22 of the motor 20. However, the present invention is not limited to the same, and may even be applied to a so-called lead wire type connector as used in a motor 50 illustrated in FIG. 7, in which lead wires 54 for electrical connection are directly connected to a wire harness connecting portion 52. In this case as well, the wire harness connecting portion 52 of the motor 50 and the through-hole 24 of the door inner panel 12 can reliably be made waterproof.

Figure 8:
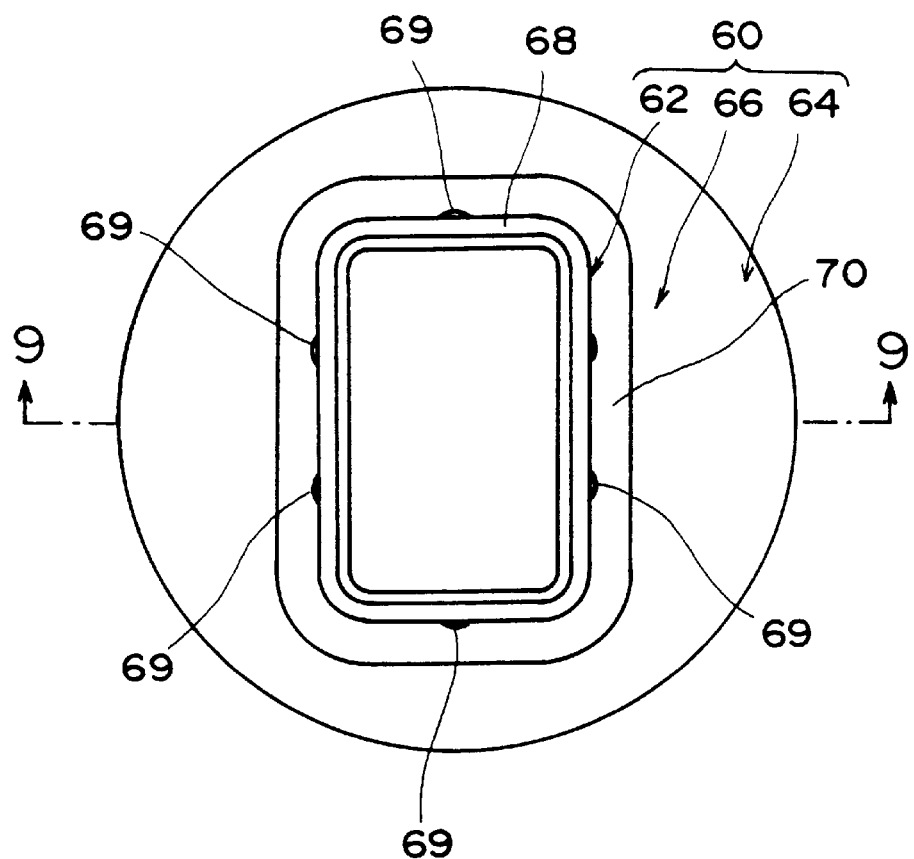
FIG. 8 is a front view of a waterproofing member relating to a second embodiment of the present invention.
Figure 9:
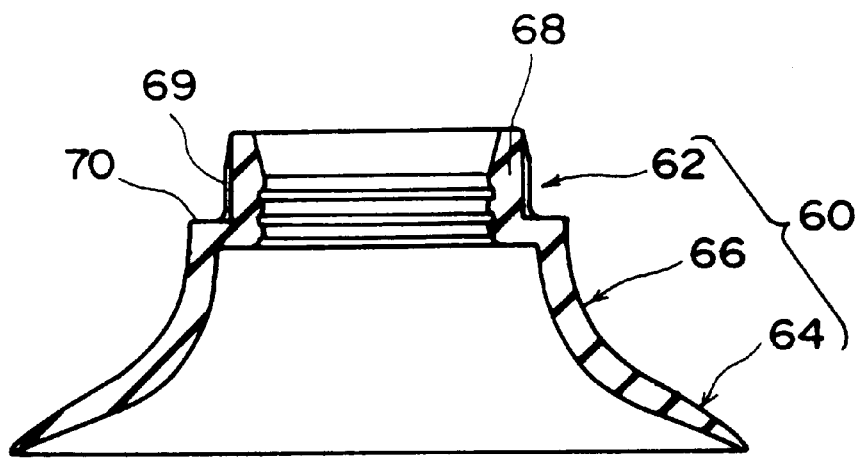
FIG. 9 is a cross-sectional view, taken along line 9—9 of FIG. 8, of the waterproofing member relating to the second embodiment of the present invention.

A waterproofing member 60 relating to a second embodiment of the present invention is illustrated in the front view of FIG. 8. FIG. 9 is a cross-sectional view of the waterproofing member 60 taken along line 9—9 of FIG. 8.

The waterproofing member 60 is formed by a mounting portion 62, a press-fit portion 64 and an elastic portion 66.

The mounting portion 62 has fundamentally the same structure as that of the waterproofing member 30 of the above-described first embodiment. A first fit-in portion 68 is formed at the mounting portion 62 along the axial direction of 60. Further, a plurality of protrusions 69 are formed at the periphery of the first fit-in portion 68 along the axial direction of 60. When the first fit-in portion 68 is fit into the groove 26 formed at the wire harness connecting portion 22 of the motor 20, the protrusions 69 press-contact the groove 26. A first flange portion 70 is formed at the mounting portion 62 along a direction orthogonal to the axis of 60. The first flange portion 70 is press-fit against the sealing seat surface 28 formed at the wire harness connecting portion 22 of the motor 20. Due to the mounting portion 62 which has the above-described structure, the waterproofing member 60 or the mounting portion 62 is fixed to the wire harness connecting portion 22 of the motor 20, and this portion (the wire harness, the connector and the like positioned at the inner side) is sealed so that water does not enter into the motor 20 and waterproofness is ensured.

The press-fit portion 64 and the elastic portion 66 are continuous, and are formed such that the diameters thereof gradually increase from the elastic portion 66 toward the press-fit portion 64, so as to form on the whole a substantially suction-cup shaped configuration. The press-fit portion 64 is press-fit against the peripheral wall of the through-hole 24 formed in the door inner panel 12 such that this portion is sealed. Entry of water into the vehicle compartment can be prevented, and waterproofness can be ensured. Further, the elastic portion 66 is elastically deformable, and due to the elastic deformation thereof, the relative positions of the mounting portion 62 and the press-fit portion 64 can be changed. In this way, in the state in which the waterproofing member 60 is disposed between the motor 20 or the wire harness connecting portion 22 and the door inner panel 12, due to the elastic deformation of the elastic portion 66, variation of the relative positions of the mounting portion 62 (i.e., the wire harness connecting portion 22 of the motor 20) and the press-fit portion 64 (i.e., the through-hole 24 of the door inner panel 12) can automatically be absorbed.

In the waterproofing member 60 having the above-described structure, the first fit-in portion 68 of the mounting portion 62 is fit-in the groove 26 formed in the wire harness connecting portion 22 of the motor 20, and the first flange portion 70 is press-fit against the sealing seat surface 28 formed at the wire harness connecting portion 22, so as to seal this portion. Entry of water into the motor can be prevented, and waterproofness can be ensured. Further, in this state, the wire harness connecting portion 22 of the motor 20 is disposed so as to oppose the through-hole 24 of the door inner panel 12. With the motor 20 and the waterproofing member 60 disposed in this state, the press-fit portion 64 is press-fit against the peripheral wall of the through-hole 24 of the door inner panel 12, and this portion is sealed. Entry of water into the vehicle compartment is prevented, and waterproofness is ensured.

In this way, waterproofing of the wire harness connecting portion 22 of the motor 20 and waterproofing of the through-hole 24 of the door inner panel 12 can be carried out simultaneously by a single waterproofing member 60. Accordingly, only a minimum number of places need be subjected to waterproofing treatment, which results in a reduction in cost and an improvement in assembly workability.

In this case, after the mounting portion 62 of the waterproofing member 60 is, in advance, fixed to and made integral with the wire harness connecting portion 22 of the motor 20, assembly is completed by merely press-fitting the press-fit portion 64 of the waterproofing member 60 against the peripheral wall of the through-hole 24 of the door inner panel 12. There is no need, as there is in the conventional art, for an operation for fitting a grommet for waterproofing into the through-hole 24 of the door inner panel 12, and for this reason as well, the assembly workability greatly improves.

Further, in the state in which the waterproofing member 60 is installed at the motor 20 (i.e., the state in which the first fit-in portion 68 is fit in the groove 26 and the first flange portion 70 is press-fit to the sealing seat surface 28), the first fit-in portion 68 which is fit in the groove 26 functions as a stopper for preventing shifting of the position of the waterproofing member 60. As a result, after the waterproofing member 60 is mounted to the motor 20, the position of the waterproofing member 60 does not shift, and the waterproofness is ensured even further.

In the state in which the waterproofing member 60 is disposed between the motor 20 or the wire harness connecting portion 22 and the door inner panel 12, due to elastic deformation of the elastic portion 66, the relative positions of the mounting portion 62 (i.e., the wire harness connecting portion 22 of the motor 20) and the press-fit portion 64 (i.e., the through-hole 24 of the door inner panel 12) can be changed. Accordingly, even if the waterproofing member 60 were to be applied to vehicle doors respectively having different dimensions between the wire harness connecting portion 22 of the motor 20 and the through-hole 24 of the door inner panel 12, or even if there was a slight error or the like in the mounting dimension of the motor 20, the difference in these dimensions would be absorbed by the elastic deformation of the elastic portion 66. As a result, there is no need, as there is in the conventional art, to change the length of the wire harness or the position of the grommet and to use a different wire harness or the like for each motor 20 or each vehicle to which the waterproofing member 60 is to be applied. The same types of parts can be used commonly for various applications, i.e., standardization of parts can be achieved.

In this way, with the waterproofing member 60 relating to the second embodiment, waterproofing of the wire harness connecting portion 22 of the motor 20 and waterproofing of the through-hole 24 of the door inner panel 12 can be carried out simultaneously. Assembly workability can be improved, and the range of application can be enlarged.

The waterproofing member 60 has a so-called suction-cup shaped configuration in which the press-fit portion 64 is continuous with the elastic portion 66 and the diameter gradually increases. Therefore, not only is waterproofness ensured, but also, since the configuration is simple, the waterproofing member 60 is easy to manufacture, and is low-cost.

As described above, the waterproofing member for a wire harness connecting portion of a motor for driving a window regulator relating to the present invention can simultaneously make the wire harness connecting portion of the motor and the through-hole of the door inner panel waterproof. Therefore, superior effects are achieved in that the cost can be reduced, the assembly workability can be improved, and the range of application can be enlarged.

What is claimed is:

1. A waterproofing member for a wire harness connecting portion comprising:

a closed tubular elastic portion with openings at both ends;

a mounting portion provided at one end of said elastic portion and fixed to the wire harness connecting portion;

a press-fit portion provided at the other end of said elastic portion and press-fitted against a through-hole of an inner door panel of a vehicle;

wherein said waterproofing member is located between the through-hole and a motor for driving a window regulator and said press-fit portion has a fit-in-portion fit-in portion which is formed alone an axial direction of said waterproofing member and is fitted into the through-hole and a second flange portion which is formed alone a direction orthogonal to said axial direction and is press-fitted against a peripheral wall of-the through-hole.

2. A waterproofing member for a wire harness connecting portion according to claim 1, wherein said waterproofing member is substantially parallelepiped.

3. A waterproofing member for a wire harness connecting portion according to claim 1, wherein said elastic portion deforms in a substantially bellows-like manner.

4. A waterproofing member for a wire harness connecting portion according to claim 1, further comprising said wire harness connecting portion having a length, in a direction parallel to an output shaft of the motor, is less than a height of a housing in which the motor is accommodated.

5. A waterproofing member for a wire harness connecting portion according to claim 1, wherein said mounting portion has a first fit-in portion formed along the axial direction of said waterproofing member and is fit into a groove formed at the wire harness connecting portion of the motor, and a first flange portion formed along a direction orthogonal to said axial direction and is press-fit against a sealing seat surface formed at the wire harness connecting portion of the motor.

6. A waterproofing member for a wire harness connecting portion according to claim 5, wherein convex and concave portions are formed at a periphery of said first fit-in portion.

7. A waterproofing member for a wire harness connecting portion according to claim 5, wherein said first flange portion is formed integrally with said first fit-in portion and protrudes from an outer peripheral portion of said first fit-in portion.

8. A waterproofing member for a wire harness connecting portion according to claim 7, wherein said mounting portion is provided with a cover portion formed at a peripheral edge of said first flange portion and extending in an orthogonal direction to cover a peripheral edge portion of the wire harness connecting portion when the wire harness is fixed to the wire harness connecting portion.

9. A waterproofing member for a wire harness connecting portion according to claim 8, wherein said cover portion is formed at only three sides of the peripheral edge of said first flange portion.

10. A waterproofing member for a wire harness connecting portion according to claim 5, wherein said press-fit portion is formed continuously with said elastic portion and such that a diameter of said press-fit portion gradually increases.

11. A waterproofing member for a wire harness connecting portion according to claim 10, wherein said first flange portion projects in a step shape integrally from said first fit-in portion at an outer peripheral portion of said first fit-in portion.

12. A waterproofing member for a wire harness connecting portion according to claim 11, wherein a plurality of projections are formed at a periphery of said first fit-in portion along the axial direction of said waterproofing member.

13. A waterproofing member for a wire harness connecting portion comprising:

a closed tubular elastic portion with openings at both ends;

a mounting portion comprising a press-fit portion and provided at one end of said elastic portion and being fixed to the wire harness connecting portion;

a press-fit portion having a circular shape, and provided at the other end of said elastic portion, and press-fitted against a peripheral wall of a through-hole of an inner door panel of a vehicle, wherein said waterproofing member is located between the through-hole and a motor for driving a window regulator and at least one of said press-fit portion comprises a sealing seat.

14. A waterproofing member for a wire harness connecting portion comprising:

a continuous closed tubular elastic tube with openings at both ends;

a first press-fit portion located at one end of said elastic tube fixed by said mounting portion to the wire harness connecting portion;

a second press-fit portion located at the other end of said elastic tube for press-fitting against a peripheral wall of a through-hole of an inner door panel of a vehicle, wherein said waterproofing member is located between the through-hole and a motor for driving a window regulator and one of said press-fit portions having a sealing seat.

* * * * *